United States Patent [19]

Satoh

[11] 4,254,550
[45] Mar. 10, 1981

[54] LAWN TRIMMER

[75] Inventor: Masatoshi Satoh, Tokyo, Japan

[73] Assignee: Kioritz Corporation, Tokyo, Japan

[21] Appl. No.: 67,209

[22] Filed: Aug. 16, 1979

[30] Foreign Application Priority Data

Aug. 18, 1978 [JP] Japan ............................ 53-112477[U]

[51] Int. Cl.³ ............................................. A01D 50/00
[52] U.S. Cl. ........................................ 30/276; 56/12.7
[58] Field of Search ................... 30/276, 347; 56/12.7

[56] References Cited

U.S. PATENT DOCUMENTS

| | | | |
|---|---|---|---|
| 3,664,102 | 5/1972 | Reber | 56/295 |
| 3,859,776 | 1/1975 | Ballas et al. | 56/12.7 |
| 3,977,078 | 8/1976 | Pittinger | 30/276 |
| 4,095,338 | 6/1978 | Naohiko | 30/276 |
| 4,104,796 | 8/1978 | Sheldon | 30/276 |

FOREIGN PATENT DOCUMENTS 38-127 of 1963 Japan .
38-6632 of 1963 Japan .

Primary Examiner—Jimmy C. Peters
Attorney, Agent, or Firm—Fleit & Jacobson

[57] ABSTRACT

A lawn trimmer comprises a housing fixed to a rotating shaft and containing a spool therein and a stub shaft threadedly received in the rotating shaft. A support member is provided for holding the spool against the housing and fixedly secured to said stub shaft. A ground engaging disc is rotatably mounted on the stub shaft and connected to the support member by means of spring loaded centrifugal elements during stoppage of the trimmer. During rotation of the trimmer, the centrifugal elements function to free connection between the disc and the support member by being subjected to the centrifugal force.

1 Claim, 3 Drawing Figures

LAWN TRIMMER

This invention relates to mowing machines and particularly, to a rotary cutting assembly therefor including a disc slidable on the ground.

Such a mowing machine hereinbefore known comprises a rotary cutting assembly secured to the end of an operating rod and a disc mounted below the rotary cutting assembly for slidable engagement with ground to enable the ground to be subjected to a part of a weight of the machine during its mowing operation.

In the known machine, different tools are used to remove a clamp nut and the slidable disc for the rotary cutting assembly in its adjustment and inspection. This is a troublesome operation.

Rotary cutting assemblies of a type wherein a nylon cord is utilized as a cutting element have been widely employed in recent years. In this type of the cutting assemblies, it is necessary to readjust the length of cord during mowing operation when the cord has worn out. For this purpose, there is a relatively large manual clamp nut mounted below the rotary cutting assembly for rotation with it. However, the clamp nut is liable to wear due to its rotation with the rotary cutting assembly and moreover, makes it difficult to attach a conventional slidable ground engaging disc to the rotary cutting assembly.

A main object of the present invention is to eliminate the above mentioned disadvantages.

A further object of the invention is to provide a mowing machine comprising a rotary cutting assembly wherein a slidable ground engaging disc is connected to a retainer for holding a spool in the rotary cutting assembly by centrifugal elements during its stoppage to serve as a clamp nut and can freely rotate independently of rotation of the cutting assembly during its mowing operation to slide on the ground.

The above objects and other features of the invention will become apparent from the following description made with reference to the accompanying drawings.

Figure 1:
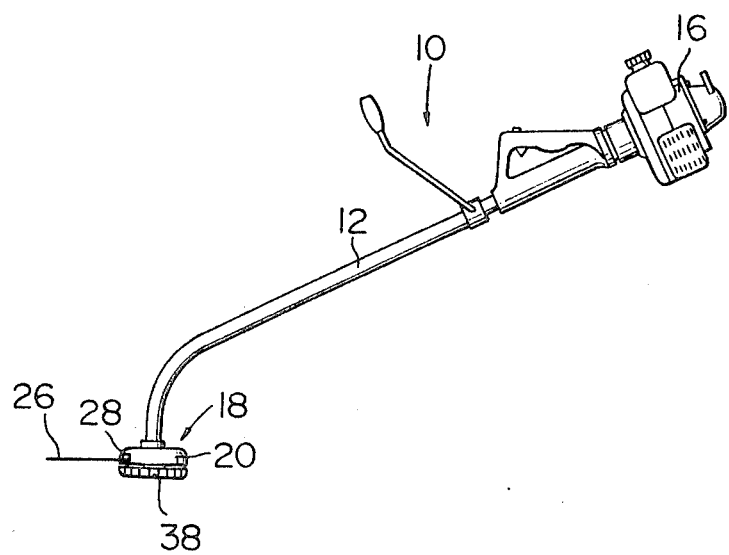
FIG. 1 is a perspective view showing a trimmer constructed in accordance with the present invention.
Figure 2:
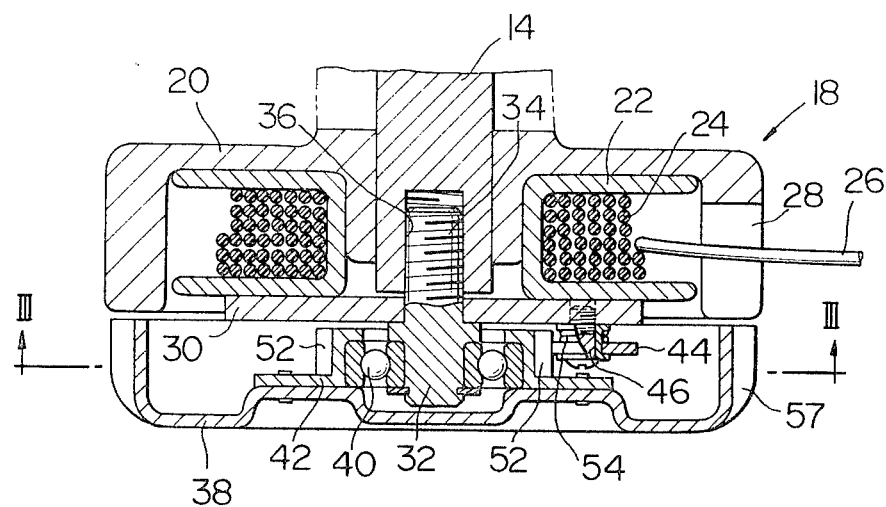
FIG. 2 is a side elevational view in section showing a cutting assembly of the trimmer.
Figure 3:
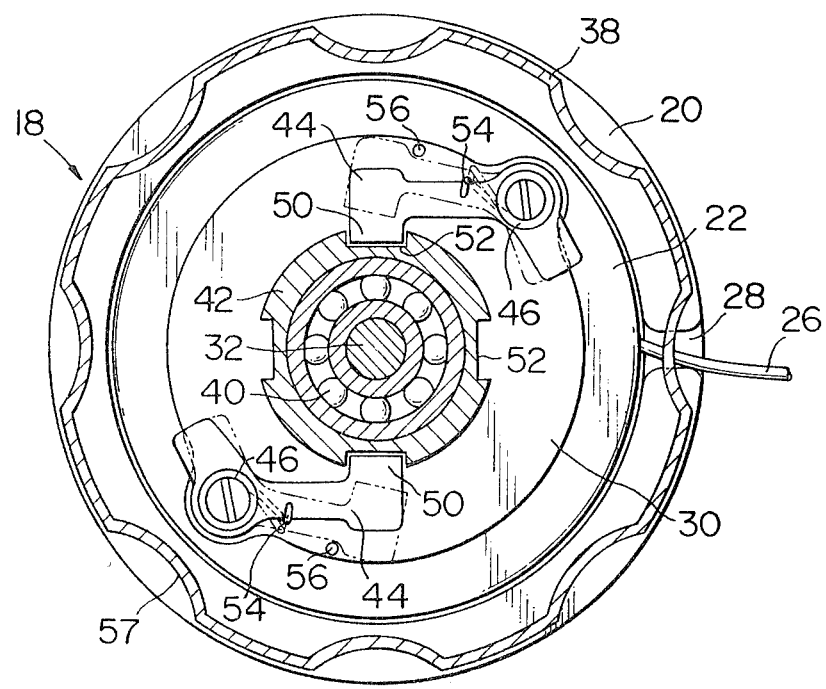
FIG. 3 is a cross-sectional view of the cutting assembly taken along line III—III of FIG. 2.

Referring now to FIG. 1 of the drawings, a trimmer generally designated by the numeral 10 is shown and comprises a rigid hollow rod 12 having a rotating shaft 14 inserted therein and extending from a drive such as an engine 16 mounted on the rigid hollow rod 12 at its upper end, and a cutting assembly 18 rotatably mounted on the lower end of the rod 12. The cutting assembly 18 includes a housing 20 rigidly fixed to the end of the rotating shaft 14 and containing a spool 22 around which a cutting nylon cord element 24 is wound. The cutting nylon cord element 24 has its free end portion 26 extending radially outwardly through a slot 28 in the peripheral wall of the housing 20 at a predetermined length.

A support member 30 in the form of a disc is provided for holding the spool 22 against the housing and fixed to a stub shaft 32 having a threaded portion 34 which is threadedly received in a tapped bore 36 provided in the rotating shaft 14 at its lower end. A ground engaging disc 38 in the form of a cup is rotatably mounted on the stub shaft 32 by means of a bearing 40 interposed between the shaft 32 and a bearing casing 42 which is secured to the disc 38 on its inner surface.

A pair of opposed centrifugal elements 44 are pivotally mounted on downwardly extending pivot pins 46 carried by the support member 30 adjacent its peripheral edge to swing around the pins between an inward operative position and an outward inoperative position. Each of the centrifugal elements 44 is provided with an inwardly directed projection 50 at the free end thereof, which engages one of grooves 52 formed in the bearing casing 42 on its periphery. A coil spring 54 is disposed around each of the fixed pivot pins 46 and secured at one end thereof to the support member 30 and at the other end to each of the centrifugal elements 44. Thus, when no rotation is imparted on the rotating shaft 14, the springs 54 act on the centrifugal elements 44 to urge them into the operative position where the projections 50 engage the grooves 52 in the bearing casing 42 to achieve interconnection between the support member 30 and the ground engaging disc 38. As the disc 38 is manually rotated by fingers engaging gripping recesses 57 formed on the periphery thereof, the rotation of the disc 38 is transmitted through the centrifugal elements 44 and the support member 30 to the stub shaft 32 to enable it to be threadedly engaged into the threaded hole 36 or loosened from it. By tightening the stub shaft 32, the support member 30 is moved upwardly to press the spool 22 against the top wall of the housing 20, thereby fixedly holding the spool 22 in place between the support member 30 and the top wall of the housing 20. It is to be understood that the threaded portion of the stub shaft 32 is tightly engaged into the threaded hole 36 by turning the stub shaft 32 in the same direction as the direction of rotation of the rotating shaft 14. Stoppers 56 may be provided on the support member 30 for restricting an amount of the outward swing motion of the centrifugal elements 44 about the fixed pivot pins 46.

During mowing operation, the rotating shaft 14 is driven by the engine 16 mounted on the rod 12 to rotate the housing 20 of the cutting assembly 18. Rotation of the cutting assembly 18 causes the cutting cord element 24 to extend radially outwardly from the periphery of the housing 20 in the form of a rigid line, thereby performing a cutting function. During rotation of the housing 20 of the cutting assembly 18, the centrifugal elements 44 swing radially outwardly against the action of the coil springs 54 by being subjected the centrifugal elements 44 to the centrifugal force so that the projections 50 of the centrifugal elements 44 disengage from the grooves 52 to prevent transmission of rotation of the housing 20 through the support member to the ground engaging disc 38. Thus, the ground engaging disc 38 can freely rotate around the stub shaft 32 and slide on the ground independently of rotation of the cutting assembly 18 to perform the cutting operation.

When the free end portion 26 of the cutting nylon cord element 24 has become shorter, rotation of the shaft 14 is stopped by stoppage of the engine 16. No centrifugal force acts on the centrifugal elements 44 so that they will be moved toward the bearing casing 42 under the action of the springs 54. Thus, the ground engaging disc 38 is connected to the support member 30 by engagement of the projections 50 of the centrifugal elements 44 with the grooves 52 in the bearing casing 42. By manually turning the ground engaging disc 38 in a direction opposite to the direction of rotation of the cutting assembly, the support member 30 is rotated to threadedly loosen the threaded portion 34 of the stub shaft 32 from the threaded hole 36 so that the support member 30 is moved away from the top wall of the housing 20 to relieve the holding pressure against the spool 22, thereby permitting its free rotation within the housing 20. Thus, the free rotation of the spool 22 permits extraction of the cutting nylon cord element from the spool.

It will be understood from the foregoing that the present invention provides a trimmer having the ground engaging disc which is automatically connected to the support member for holding the spool in the housing during stoppage of the cutting assembly, but can freely rotate independently of the support member during mowing operation of the cutting assembly.

I claim:

1. A trimmer comprising a housing rigidly fixed to the end of a rotating shaft, a spool around which a cutting nylon cord element is wound and which is contained in said housing, said cord element having its free end portion extending radially outwardly through the wall of the housing, a stub shaft threadedly received in said rotating shaft at its lower end, a support member fixedly secured to said stub shaft for holding said spool against the housing, a ground engaging disc rotatably mounted on said stub shaft by means of a bearing, a bearing casing secured to the inner surface of said disc and having grooves formed therein, and a pair of opposed spring loaded centrifugal elements pivotally mounted on said support member and engaging said grooves for connection of said disc with said support member during stoppage of the trimmer, said centrifugal elements being moved radially outwardly of said bearing casing under the centrifugal force during rotation of the trimmer to disengage from the grooves.

* * * * *